United States Patent
Hyppönen

(10) Patent No.: US 7,266,845 B2
(45) Date of Patent: Sep. 4, 2007

(54) MAINTAINING VIRUS DETECTION SOFTWARE

(75) Inventor: Ari Hyppönen, Degerby (FI)

(73) Assignee: F-Secure Oyj, Helsinki (FI)

( * ) Notice: Subject to any disclaimer, the term of this patent is extended or adjusted under 35 U.S.C. 154(b) by 851 days.

(21) Appl. No.: 10/362,828

(22) PCT Filed: Aug. 20, 2001

(86) PCT No.: PCT/EP01/09643

§ 371 (c)(1),
(2), (4) Date: Feb. 27, 2003

(87) PCT Pub. No.: WO02/19067

PCT Pub. Date: Mar. 7, 2002

(65) Prior Publication Data

US 2004/0083384 A1    Apr. 29, 2004

(30) Foreign Application Priority Data

Aug. 31, 2000 (GB) ................................. 0021278.7

(51) Int. Cl.
G06F 11/30 (2006.01)

(52) U.S. Cl. .................. 726/24; 726/22; 713/188; 709/246

(58) Field of Classification Search ............. None
See application file for complete search history.

(56) References Cited

U.S. PATENT DOCUMENTS 5,802,275 A * 9/1998 Blonder ................. 726/23
5,842,002 A * 11/1998 Schnurer et al. ............ 703/21
5,948,104 A * 9/1999 Gluck et al. ................ 726/24
6,035,423 A 3/2000 Hodges et al.
6,842,861 B1 * 1/2005 Cox et al. ................. 713/188

FOREIGN PATENT DOCUMENTS

EP       0 772 367 A    5/1997
EP       0 999 099 A    5/2000
WO       WO 00/29998    5/2000

OTHER PUBLICATIONS

Greene, M., 'Palm, Cell Phone Viruses Distant', SecurityFocus, Jun. 14, 2000, entire document, http://www.securityfocus.com/news/48.*
Honen, T., et al, 'Dial M for malware', Virus Bulletin, Aug. 1, 2006, entire document http://www.virusbtn.com/virusbulletin/archive/2006/08/vb200608-M-malware.dkb.*
"F-Secure Announces World's First Anti-Virus Product for Wireless Information Devices", Internet Article, Aug. 15, 2000.
T. Atkinson, "F-Secure Products: Installation Guidelines & Advice (Version 2.0)", Internet Article, Aug. 8, 2000.

* cited by examiner

Primary Examiner—Nasser Moazzami
Assistant Examiner—Ronald Baum
(74) Attorney, Agent, or Firm—Squire, Sanders & Dempsey L.L.P.

(57) ABSTRACT

A method of managing a virus signature database associated with an anti-virus application, both of which are resident in a memory of a mobile wireless device 2,4. Management messages containing for example new virus signatures are sent from the network 1 to the device 2,4. In accordance with instructions contained in the management messages, individual signature entries of the virus signature database are deleted or replaced, and new signatures added.

11 Claims, 3 Drawing Sheets

MAINTAINING VIRUS DETECTION SOFTWARE

The present invention relates to maintaining virus detection software and in particular, though not necessarily, to maintaining virus detection software for use with mobile wireless devices.

The last decade has seen a rapid growth in the number and use of mobile cellular telephones. More recently, wireless devices known as "communicators" have been introduced and combine the functionality of mobile telephones and Personal Digital Assistants (PDAs). It is expected that this area will undergo massive growth in the near future as new cellular telecommunication standards (e.g. GPRS, UMTS, WAP) make possible the high speed transfer of data across the wireless interface.

The next generation of mobile telephones are likely to resemble a mini-computer rather than a telephone per se. Also, whilst to date cellular telephones have been very much manufacturer specific in terms of both hardware and software, future wireless devices are likely to be built on a much more open platform. This will allow the introduction into the devices of third party applications and will further fuel growth in much the same way as Microsoft Windows™ has done for personal computers.

It can be expected that the opening up of mobile wireless platforms will make such platforms susceptible to attack from so-called "malware" such as viruses, Trojan horses, and worms (referred to collectively hereinafter as "viruses") in much the same way as the openness of present day PCs and workstations makes them susceptible to malware attack. A number of mobile telephone viruses have recently been identified in the wild. In order to resist virus attacks, anti-virus software will be deployed into mobile platforms in much the same way as it has been deployed in the desktop environment.

A number of different desktop anti-virus applications are currently available. The majority of these applications rely upon a basic scanning engine which searches suspect files for the presence of predetermined virus signatures. These signatures are held in a database which must be constantly updated to reflect the most recently identified viruses. Typically, users download replacement databases every so often, either over the Internet, from a received e-mail, or from a CDROM or floppy disc. Users are also expected to update there software engines every so often in order to take advantage of new virus detection techniques (e.g. which may be required when a wholly new strain of virus is detected).

Mobile wireless platforms present a series of problems for software developers (including developers of anti-virus software). Chief among these are the limited memory and processing power of mobile platforms, and the limited input/output capabilities which they possess (i.e. no CDROM of floppy drive, and no high bandwidth fixed line network or Internet connectivity).

According to a first aspect of the present invention there is provided a method of managing a virus signature database associated with an anti-virus application, both of which are resident in a memory of a computer device, the method comprising adding, deleting, and replacing individual signature entries of the virus signature database to maintain the effectiveness of the database.

The present invention is applicable in particular to mobile wireless platforms and devices such as mobile telephones, communicators, and palmtop and laptop computers with wireless interfaces. The invention is also applicable to other computer devices such as PCs, workstations, etc.

The inventors of the present invention have recognised that it will be difficult (and potentially expensive) to download an entire virus signature database to a mobile wireless device each time that an update to the database is required. By allowing the management of individual signature entries of the database, the updating process becomes incremental and is greatly simplified in many respects. For example, in order to update the database when a new virus is detected (and a signature generated for that virus), it is only necessary to download that signature and add it to the database (processing requirements are also reduced).

Preferably, the method comprises receiving management messages over the wireless interface, the management messages containing respective instructions, e.g. add, delete, or replace a virus signature. In the case of an add or replace signature instruction, the message may be accompanied by a new signature (where the new signature is contained in the management message or in a separate message). Management messages may be pushed to users, i.e. the messages are sent without a request from users, or pulled by users, i.e. messages are sent following the receipt of a request from users.

Preferably, management messages are accompanied by respective sequence numbers. The anti-virus application, or a management agent, resident in the memory of the wireless device uses the sequence number of a received management message to determine whether or not one or more preceding management messages have not been received. If it is determined that a management message has not been received, the application or agent may request that message via the wireless interface. The sequence number may be device or subscriber specific.

Virus signatures may be relevant to specific mobile wireless devices and to specific software. As such, management messages may be filtered either at the origin side of the wireless interface, prior to transmission over the wireless interface, or following receipt at a mobile device, to allow only messages relevant to a particular device (or software installed on that device) to be sent to that device or to be acted upon at the device.

Preferably, said mobile wireless device is a cellular communication device having an interface for allowing the device to communicate with a cellular telecommunications network. For example, the network may be a GSM network or a UMTS (3GPP) network. Management messages sent to the device may originate in the network or at a third party site in which case the network provides a transit network.

It will be appreciated that the anti-virus application may be a stand-alone application or may be embedded in some other application.

According to a second aspect of the present invention there is provided a computer device having a memory and an anti-virus software application resident in the memory, the memory also containing an anti-virus signature database accessible in use by the anti-virus application, the apparatus comprising processing means for adding, deleting, and/or replacing individual signature entries of the virus signature database.

Preferably, the computer device is a mobile wireless device.

According to a third aspect of the present invention there is provided a method of managing a virus signature database associated with an anti-virus application, both of which are resident in a memory of a mobile wireless device, the method comprising receiving management messages, relating to database or anti-virus application changes, at the device, the management messages being filtered either at the origin side of the wireless interface or at the mobile device to pass only messages relevant to the recipient device.

In certain embodiments of the above third aspect of the present invention, the filter at the mobile device or at the origin side of the wireless interface has a knowledge of the properties of the mobile device (e.g. make, model) and/or of the software applications resident on the mobile device. Where the filter exists at the origin side of the wireless interface, this information may be sent to the filter from the mobile device. Management messages may contain the identity of mobile devices and/or applications to which they are relevant, such that the filter may compare the applicability of messages to the properties/resident software of destination mobile devices.

According to a fourth aspect of the present invention, there is provided a method of scanning information for the presence of a virus, the method comprising extracting predetermined virus signatures from a virus signature database and sequentially searching for the presence of signatures in the information, wherein the database contains for each of one or more viruses a plurality of signatures, and indicating the presence or absence of each of said one or more viruses based on a combination of the results of the plurality of searches.

For a better understanding of the present invention and in order to show how the same may be carried into effect reference will now be made by way of example to the accompanying drawings in which.

Figure 1:
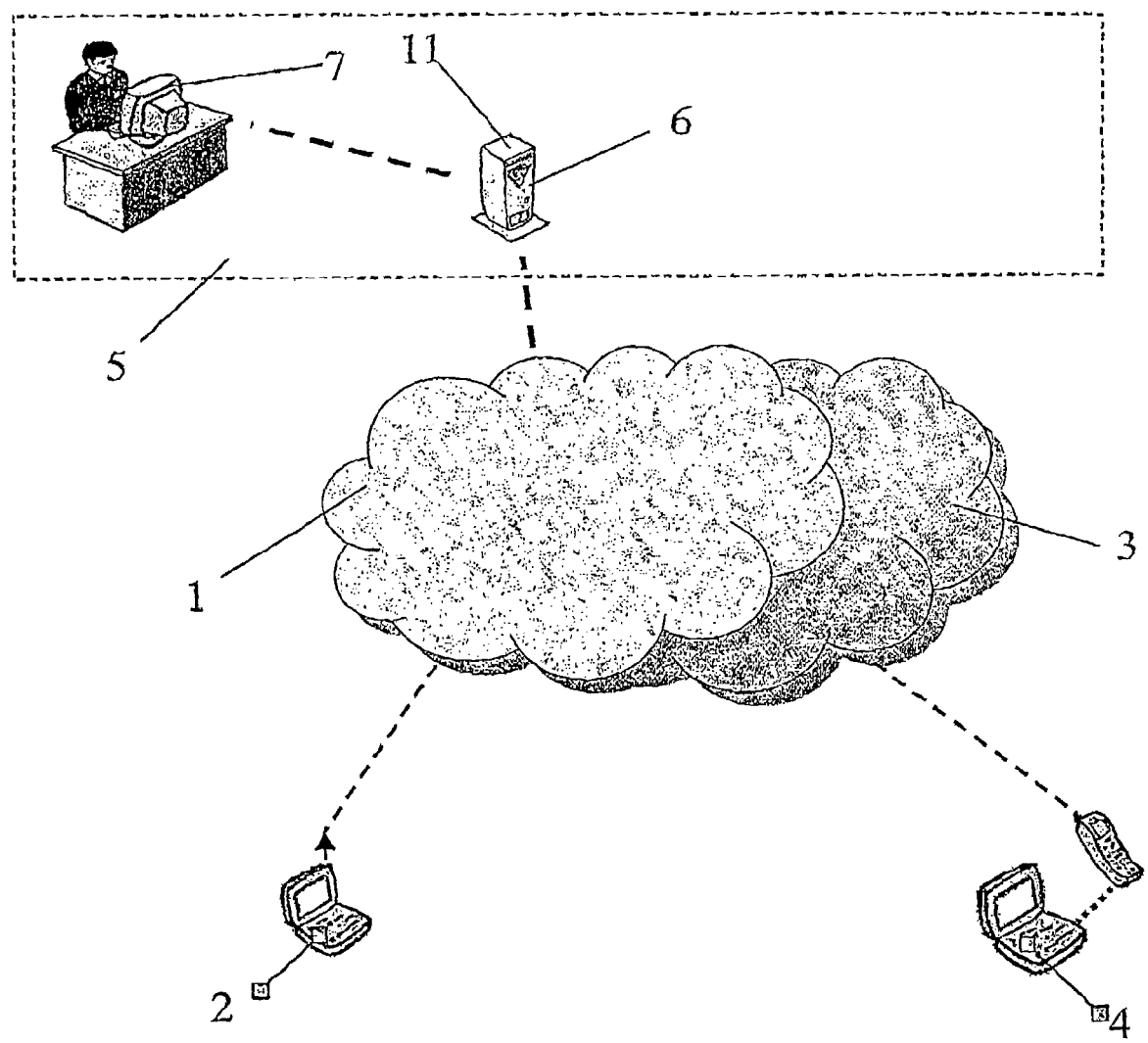
FIG. 1 illustrates schematically a cellular telecommunications network suitable for distributing anti-virus software and database updates.

There is illustrated in FIG. 1 a Public Land Mobile Network (PLMN) 1 which is the home network of a subscriber using a wireless device 2. The device 2 illustrated is a communicator type device. For the purpose of the following discussion, the PLMN 1 is assumed to be a GSM network. A second PLMN 3 is illustrated in the Figure, and this PLMN may represent a foreign or visited network for a roaming subscriber (using a wireless device 4 comprising a PDA and mobile telephone) whose home network is also the PLMN 1.

A Management Centre 5 operated by a third party anti-virus software manufacturer/distributor is coupled to the PLMN 1 and comprises a Management Server 6 and a Management Console 7. The Management Server 6 is connected to the communication backbone of the PLMN 1, e.g. to an MSC (not shown in the Figure). Via the Management Console 6, the operator is able to send SMS messages and data to devices such as the devices 2,4, and receive the same from these devices. It is assumed that the users of the mobile devices 2,4 have subscribed to a service of the Management Centre 5.

Figure 2:
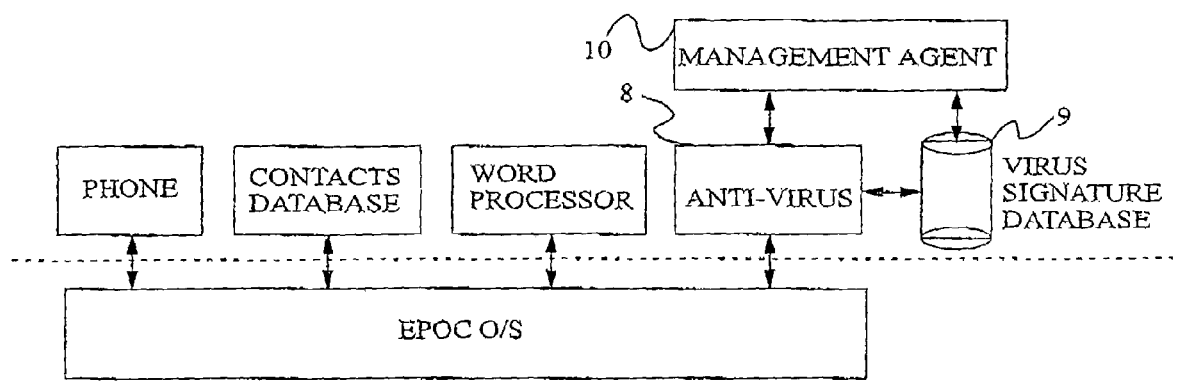
FIG. 2 illustrates the software architecture of a mobile wireless device.

The devices 2,4 each have a memory storage means on which resides the operating system of the device. This may be for example EPOC or Windows CE™. A number of application programs are pre-loaded by the manufacturer or by the device supplier into the memory. These applications may comprise a phone application (used for making and controlling phone calls), a contacts database, and a word processor. The memory also contains an anti-virus application which may be a standalone application, part of a suite of security applications, or may be integrated into some other application. FIG. 2 illustrates a part of the software architecture of a mobile device 2,4.

The core of the anti-virus application is a virus scanning engine 8 which may resemble for example the scanning engine of the F-Secure Anti-Virus™ product family of F-Secure Oyj (Espoo, Finland). Associated with the scanning engine 8 is a virus signature database 9 which contains a sequence of virus signatures. The basic database structure is created when the anti-virus application is installed into the device 2,4. At the same time, the database 9 is populated with known virus signatures. In order to reduce the memory space occupied by the database 9, the virus signatures may be relatively short compared to the length of conventional anti-virus signatures. However, for certain viruses, this shortening of the virus signature may lead to a significant loss in the certainty with which viruses may be detected (and to an increase in false alarms). To overcome this problem, for certain viruses a plurality of signatures may be inserted into the database 9. These signatures may be linked or "chained" together, such that a virus warning is only generated if all (or possibly a subset of) signatures are identified in a scanned file. Multiple signatures may also be used to generate a detection confidence estimate.

Also installed into the device's memory is a management agent 10. The management agent 10 is responsible for maintaining the database 9 and the anti-virus software 8 in response to management messages received from the Management Centre 5 over the wireless interface. The management messages may be sent using any suitable bearer such as a circuit switched or packet switched data connection (e.g. during a WAP session), or the Short Message Service (SMS) in GSM networks. The management agent 10 can access individual records of the virus signature database 9 to either enter new signatures into blank records, delete current signatures, or replace an existing signature. The management agent is also able to execute software patches in order to update the anti-virus scanning engine 8.

A management message sent from the Management Centre 5 to a mobile device 2,4 typically comprises a header portion which contains a subscriber specific sequence number, and a flag indicating whether the management message relates to a software or database update. In the case of a database update, the header ball also include a database entry number, and an instruction. Each time a new message is sent from the Management Centre 5 to a device, the sequence number is incremented by 1. In order to ensure that messages can be authenticated by a receiving device, messages are cryptographically signed at the Management Centre 5.

Following receipt of a management message at a mobile device 2,4, the message is passed to the management agent 10 where the cryptographic signature is checked. Assuming that the message is indeed authenticated, the management agent first compares the sequence number contained in the header with the sequence number of the last received message. In the event that the sequence number of the new message is the next expected sequence number, the updating procedure can proceed as described below. In the event that the sequence number of the new message is not the next expected sequence number, an error report is generated. This causes the management agent 10 to identify the missing updates and to request these (in order) from the Management Centre 5.

In the event that the sequence number of a received message is as expected, the management agent 10 determines whether or not the message relates to a software or database update. In the former case, the agent causes the update to be executed, automatically updating the software using an executable file contained in the payload of the message. In the latter case, the management agent 10 examines the database entry number and the instruction of the message header. The database entry number identifies a position in the database 9 which is to be operated upon, and the instruction identifies an operation such as ADD_NEW_SIGNATURE, DELETE_EXISTING_SIGNATURE, or REPLACE_EXISTING_SIGNATURE. The message may contain a payload section for carrying data. For example, this data could be a new or replacement virus signature.

At the Management Centre 5, new virus signatures will be created as and when new viruses are detected. This will cause management messages containing the ADD_NEW_SIGNATURE instruction to be sent to subscribers. In some cases, an improved signature for a known virus may be generated, in which case a management messages containing the REPLACE_EXISTING_SIGNATURE instruction is sent to subscribers. Occasionally, a virus signature sent previously to subscribers may later be found to be ineffective, or may be found to generate false alarms, in which case a management message containing the DELETE_EXISTING_SIGNATURE instruction is sent to subscribers.

An update filter 11 is located at the Management Server 6 of the Management Centre 5. All management messages pass through this filter 11. The filter 11 contains a subscriber database, and for each subscriber records the manufacturer and model number of their mobile devices. The database may also record details of applications installed in subscriber devices. This information may be collected during the subscriber registration process, or may be collected dynamically. Management messages contain in their headers, or are accompanied by, information identifying the devices and/or applications to which they are applicable. This information allows the filters to direct messages only to those devices to which the messages are appropriate. This achieves a significant reduction in the use of the wireless interface resources, as well as a reduction in the processing requirements placed on the mobile devices. The sequence number is added to the header of a management message only after the message has passed through the filter. This ensures that the sequence number is device specific.

Figure 3:
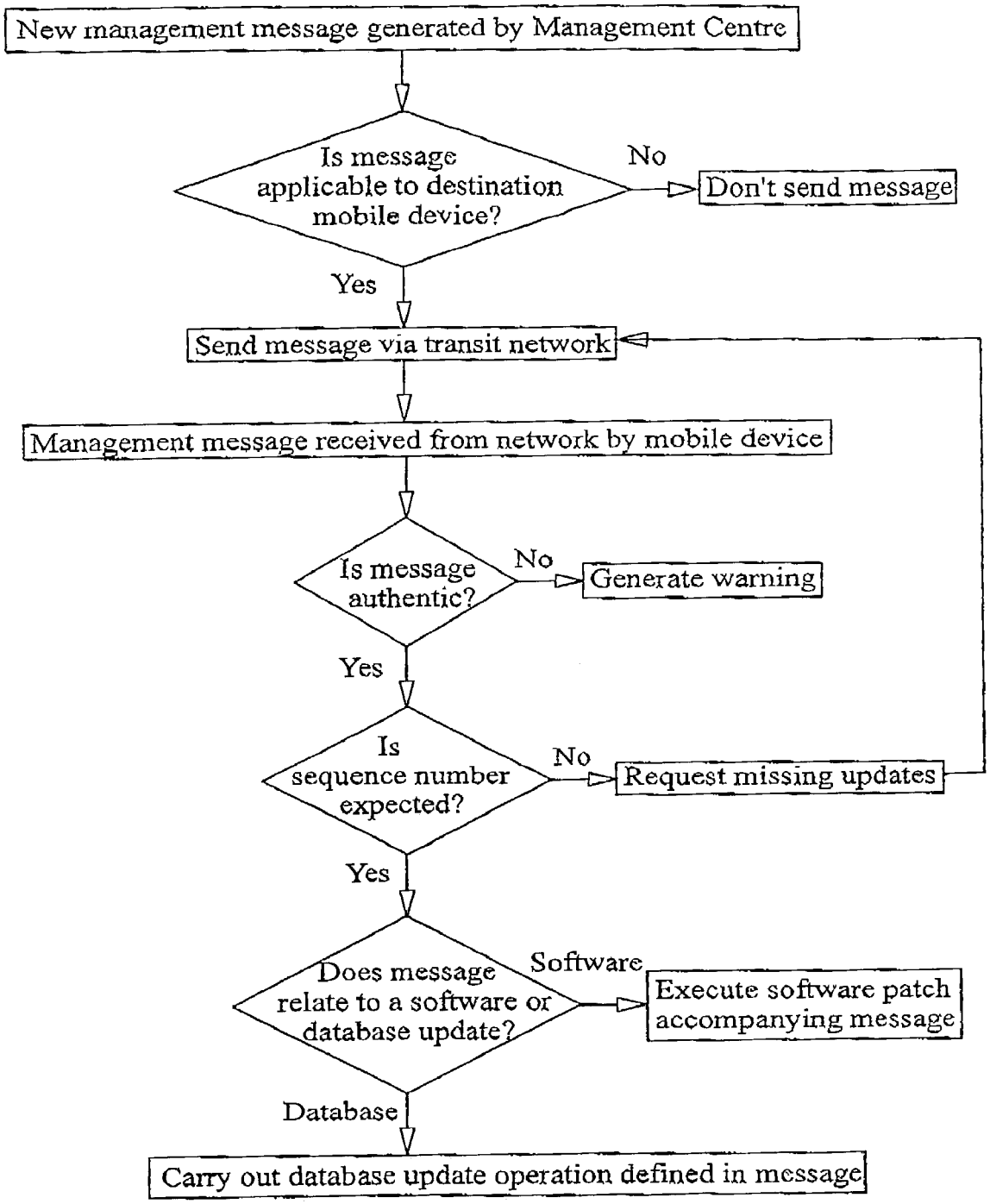
FIG. 3 is a flow diagram illustrating a method of updating anti-virus software and an associated database of the device of FIG. 2 using the network of FIG. 1.

FIG. 3 is a flow diagram further illustrating a method of updating anti-virus software and signature databases using the network of FIG. 1.

It will be appreciated by the person of skill in the art that various modifications may be made to the above described embodiment without departing from the scope of the present invention. Systems may be designed in which software or database updates are automatically sent to mobile devices (i.e. updates are pushed to mobile devices), or where the updates are sent following a requests from mobile devices (i.e. updates are pulled to mobile devices). In another modification to the described embodiment, the filter present at the Management Centre 5 may be informed of the properties of a destination mobile device during a communication session, e.g. based on the http headers sent from a browser of a device during a WAP session. In yet another modification to the described embodiment, a management message may relate to a plurality of virus database entries. For example, the message may identify two database records with the payload containing two respective new signatures. In yet another modification to the described embodiment, the management message may comprise a sequence of packets which are concatenated upon reception at the mobile device. In yet another modification to the described embodiment, the management message may identity an address (e.g. a WAP or WWW URL) from where a new signature may be downloaded. There is thus no need to include the signature in the message itself.

The invention claimed is:

1. A method of managing a virus signature database associated with an anti-virus application, both of which are resident in a memory of a mobile wireless computer device, the method comprising:
   receiving management messages over the wireless interface, the management messages containing respective add, delete, or replace virus signature instructions for adding, deleting and replacing individual signature entries of the virus signature database to maintain the effectiveness of the database;
   wherein the method further comprises filtering the management messages either at the origin side of the wireless interface, prior to transmission over the wireless interface, or following receipt at a mobile device, to allow only messages relevant to a particular device or software installed on that device to be sent to that device or to be acted upon at the device.

2. A method according to claim 1, wherein in the case of an add or replace signature instruction, the message is accompanied by a new signature.

3. A method according to claim 1, wherein management messages are accompanied by respective sequence numbers and the anti-virus application, or a management agent, resident in the memory of the wireless device uses the sequence number of a received management message to determine whether or not one or more preceding management messages have not been received.

4. A method according to claim 3, wherein, if it is determined that a management message has not been received, the application or agent requests that message via the wireless interface.

5. A method according claim 1, wherein said mobile wireless device is a cellular communication device having an interface for allowing the device to communicate with a cellular telecommunications network.

6. A mobile wireless computer device having a memory and an anti-virus software application resident in the memory, the memory also containing an anti-virus signature database accessible in use by the anti-virus application, the device comprising:
   a receiver for receiving management messages over a wireless interface, the management messages containing respective add, delete, or replace virus signature instructions for adding, deleting and replacing individual signature entries of the virus signature database to maintain the effectiveness of the database;
   filtering means for filtering the management messages to allow only messages relevant to the device or software installed on the device to be acted upon at the device; and
   processing means for adding, deleting, or replacing individual signature entries of the virus signature database.

7. A method of managing a virus signature database associated with an anti-virus application, both of which are resident in a memory of a mobile wireless device, the method comprising receiving management messages, relating to database or anti-virus application changes, at the device, the management messages being filtered either at the origin side of the wireless interface or at the mobile device to pass only messages relevant to the recipient device.

8. A method according to claim 7, wherein the filter at the mobile device or at the origin side of the wireless interface has a knowledge of the properties of the mobile device or of the software applications resident on the mobile device.

9. A method according to claim 7, wherein the filter exists at the origin side of the wireless interface, and properties of the mobile device or of the software applications resident on the mobile device are sent to the filter from the mobile device.

10. A method according to claim 7, wherein the management messages contain the identity of mobile devices or applications to which they are relevant, such that the filter may compare the applicability of messages to the properties/resident software of destination mobile devices.

11. A method of scanning information for the presence of a virus, the method comprising extracting predetermined virus signatures from a virus signature database and sequentially searching for the presence of signatures in the information, wherein the database contains for each of one or more viruses a plurality of signatures, and indicating the presence or absence of each of said one or more viruses based on a combination of the results of the plurality of searches.

* * * * *